2,806,068
Patented Sept. 10, 1957

2,806,068

PROCESS FOR THE PURIFICATION OF DIPHENYLOL PROPANE

Johan Piet Abrahams, Amsterdam, Netherlands, assignor to Koninklijke Zwavelzuurfabrieken v/h Ketjen N. V., Amsterdam, Netherlands, a limited-liability company of the Netherlands No Drawing. Application February 2, 1955,
Serial No. 485,810

Claims priority, application Netherlands
February 11, 1954

7 Claims. (Cl. 260—619)

In large scale production diphenylol propane usually is prepared by the condensation of phenol with acetone. This condensation proceeds under the influence of acids, such as sulphuric acid and hydrochloric acid. Sometimes other substances are added which act as a catalyst or in one way or another favorably influence the reaction. The reaction product is separated from the medium and purified by washing with water, to which a little ammonia has sometimes been added.

In this manner a product is obtained which, besides diphenylol propane, still contains impurities. This is apparent from the melting point of the crude product which is considerably lower than the melting point of pure diphenylol propane as mentioned in the literature.

For a number of applications the product purified by washing may be used without much trouble. For other applications it is, however, very advantageous to use diphenylol propane of a higher purity. An example of such an application is the preparation of the so-called Epon resins.

The present invention relates to a process for the purification of diphenylol propane to a product satisfying high requirements. The process is based on the surprising discovery that if the "crude" diphenylol propane under certain circumstances is treated with a solution of an alkali metal hydroxide in water the diphenylol propane mainly dissolves and the impurities remain mainly undissolved as a resinous mass. The impurities may be separated and the diphenylol propane may be recovered in purified form from the clear solution, e. g., after precipitation with an acid.

The circumstances under which a good separation of the diphenylol propane and the impurities is obtained, are rather sharply limited.

If too much alkali metal hydroxide is added, the impurities dissolve entirely or partially. If the proportion of alkali metal hydroxide is chosen too small, undissolved diphenylol propane is lost together with the impurities.

The ratio between the proportions of diphenylol propane and alkali metal hydroxide, consequently, is very important, but may be determined from case to case by simple tests. With sodium hydroxide as an alkali metal hydroxide this ratio varies as to the quality of the crude diphenylol propane and the other circumstances approximately from 1 gram molecule of diphenylol propane to 0.8–3.0 gram molecules of sodium hydroxide.

The ratio between the quantities of diphenylol propane and water in the solution also is of great importance.

Expressed in percents by weight this ratio may vary from very low percentages to approximately 20% of diphenylol propane.

The determining feature here is the degree of purity of the crude diphenylol propane. The less pure the crude diphenylol propane is the lower the concentration that should be used to achieve the desired purification effect.

Furthermore the concentration also influences the ratio diphenylol propane-alkali metal hydroxide which is to be used. With lower concentrations relatively more hydroxide is necessary.

Also the temperature has a considerable influence. This affects the solubilities and also the speed with which the crude diphenylol propane dissolves. In general it is recommendable to operate at a slightly elevated temperature. With higher temperatures, however, a discoloring of the product is obtained, so that one should generally operate with temperatures below 60° C.

For some applications of diphenylol propane, iron and lead salts may only be present in extremely small quantities, namely in the order of magnitude of some thousandths of percents.

These metal salts are very difficult to avoid in such slight quantities when preparing crude diphenylol propane.

Also the process according to the present invention insofar as it has been described up till now, does not guarantee that the purified product satisfies the said very sharp requirements.

According to a further characterizing feature of the invention, lead, iron and other polyvalent metal ions which may be present can be removed to a large degree.

This characterizing feature of the invention is based on the surprising fact that hydrated manganese dioxide is capable of binding an important part of the polyvalent ions from the alkaline solution of diphenylol propane.

Hydrated manganese dioxide as obtained with the alkaline oxidations of organic substances with potassium permanganate is e. g. very suitable for this treatment.

It is clear that the present invention may be carried out in many ways.

The different substances may e. g. be combined in an arbitrary order. Also the correct final composition of the "crude" diphenylol propane solution may be achieved in different manners. It may be composed immediately but also by the stepwise addition of one or more components. Also it is possible to add first an excess of hydroxide and thereupon to reduce the content to the correct value with the aid of an acid.

The hydrated manganese dioxide may be added to the crude solution of diphenylol propane and be separated together with the resinous impurities. The manganese dioxide may, however, also be added to the purified diphenylol propane solutions and isolated by an additional filtration.

The invention is further elucidated by the following examples to which it, however, is not restricted at all.

*Example 1*

Crude diphenylol propane with a melting point of 147–150° C. containing 0.0062% of lead and 0.023% of iron is purified in the following manner.

A vessel with stirrer is filled with 856 parts by weight of water. The temperature is brought to 40° C. and subsequently 78 parts by weight of crude diphenylol propane and 66 parts by weight of 33% of soda lye are added. The mol ratio diphenylol propane-sodium hydroxide, consequently, amounts to 1:1.6. After stirring for approximately 10 minutes the diphenylol propane has dissolved and the impurities have deposited as a floating resinous mass.

Now 3.5 parts by weight of hydrated pyrolusite are added. After stirring for another 10 minutes the mixture is filtrated in a vacuum filter which is provided with a thin layer of hydrated pyrolusite.

The filtrate is collected in a second vessel with stirrer. A slight quantity of sodium hydrosulphite is added and the diphenylol propane is precipitated with 30% sulphuric acid which is free of lead and iron. The product is isolated on a vacuum filter, washed and dried.

The thus purified product has a melting point of 155–157° C. and contains 0.0005% of lead and 0.0015% of iron.

*Example II*

The same diphenylol propane as in Example is purified in the manner described there, but starting from the composition:

704 parts by weight of water,
152 parts by weight of crude diphenylol propane,
144 parts by weight of 33% soda lye,
20 parts by weight of hydrated manganese dioxide.

The mol ratio diphenylol propane-sodium hydroxide, consequently, amounts to 1:1.8.

The quantity of resinous impurities which is isolated is relatively smaller than in Example I. The melting point of the purified product amounts to 154–156° C., the lead content to 0.0006%, the iron content to 0.0014%.

*Example III*

The crude diphenylol propane of Example I is purified according to the same process but starting from the following recipe:

968 parts by weight of water,
14 parts by weight of crude diphenylol propane,
18 parts by weight of 33% of soda lye,
3 parts by weight of hydrated manganese dioxide.

The mol ratio diphenylol propane-sodium hydroxide here, consequently, amounts to 1:2.4.

The purified product has a melting point of 155–157° C., a lead content of 0.0006% and an iron content of 0.0017%.

*Example IV*

The crude diphenylol propane of Example I is purified in the same manner but now with potassium hydroxide as an alkali metal hydroxide.

906 parts by weight of water,
52 parts by weight of crude diphenylol propane,
42 parts by weight of 50% of potassium lye,
10 parts by weight of hydrated manganese dioxide.

The mol ratio diphenylol propane-potassium hydroxide here, consequently is 1:1.6.

The purified product has a melting point of 154–156° C., a lead content of 0.0006% and an iron content of 0.0016%.

What is claimed is:

1. A process for the purification of diphenylol propane resulting from the acidic condensation of phenol and acetone and containing resinous impurities comprising treating the crude diphenylol propane containing at least 4 parts, by weight, of water per part by weight of diphenylol propane at a temperature not exceeding 60° C. with a quantity of an aqueous solution of an alkali metal hydroxide such that the mol ratio of diphenylol propane to alkali metal hydroxide is between 1:0.8 and 1:3.0 thereby substantially dissolving the diphenylol propane while impurities present in the crude diphenylol propane remain at least partially undissolved, whereupon said undissolved impurities are isolated and the diphenylol propane is recovered from the solution.

2. A process for the purification of diphenylol propane containing lead and iron ions as impurities therein comprising treating the crude diphenylol propane with an aqueous solution of an alkali metal hydroxide such that the mol ratio of diphenylol propane to alkali metal hydroxide is between 1:0.8 and 1:3.0 and with an effective quantity of hydrated manganese dioxide thereby substantially dissolving the diphenylol propane while impurities present in the crude diphenylol propane remain at least partially undissolved, whereupon said undissolved impurities are isolated and the diphenylol propane is recovered from the solution.

3. A process for the purification of diphenylol propane resulting from the acidic condensation of phenol and acetone and containing resinous impurities comprising treating the crude diphenylol propane containing 4 to 99 parts, by weight, of water per part, by weight, of diphenylol propane at a temperature not exceeding 60° C. with a quantity of an aqueous solution of an alkali metal hydroxide such that the mol ratio of diphenylol propane to alkali metal hydroxide is between 1:0.8 and 1:3.0 thereby substantially dissolving the diphenylol propane while impurities present in the crude diphenylol propane remain at least partially undissolved, whereupon said undissolved impurities are isolated and the diphenylol propane is recovered from the solution.

4. A process for the purification of diphenylol propane resulting from the acidic condensation of phenol and acetone and containing resinous impurities comprising treating the crude diphenylol propane containing 4 to 99 parts, by weight, of water per part by weight of diphenylol propane at a temperature not exceeding 60° C. with a quantity of an aqueous solution of an alkali metal hydroxide such that the mol ratio of diphenylol propane to alkali metal hydroxide is between 1:0.8 and 1:3.0 thereby substantially dissolving the diphenylol propane while impurities present in the crude diphenylol propane remain at least partially undissolved, whereupon said undissolved impurities are isolated and the diphenylol propane is recovered from the solution by precipitation with dilute sulfuric acid which is free of lead and iron salts.

5. A process for the purification of diphenylol propane containing lead and iron ions as impurities therein comprising treating the crude diphenylol propane containing 4 to 99 parts, by weight, of water per part by weight of diphenylol propane with an alkali metal hydroxide such that the mol ratio of diphenylol propane to alkali metal hydroxide is between 1:0.8 and 1:3.0 and with an effective quantity of hydrated manganese dioxide thereby substantially dissolving the diphenylol propane while impurities present in the crude diphenylol propane remain at least partially undissolved, whereupon said undissolved impurities are isolated and the diphenylol propane is recovered from the solution.

6. A process for the purification of diphenylol propane containing lead and iron ions as impurities therein comprising treating the crude diphenylol propane with an aqueous solution of an alkali metal hydroxide such that the mol ratio of diphenylol propane to alkali metal hydroxide is between 1:0.8 and 1:3.0 and with an effective quantity of hydrated manganese dioxide thereby substantially dissolving the diphenylol propane while impurities present in the crude diphenylol propane remain at least partially undissolved, whereupon said undissolved impurities are isolated and the diphenylol propane is recovered from the solution by precipitation with dilute sulfuric acid which is free of lead and iron salts.

7. A process for the purification of diphenylol propane containing lead and iron ions as impurities therein comprising treating the crude diphenylol propane with an aqueous solution of sodium hydroxide such that the mol ratio of diphenylol propane to sodium hydroxide is between 1:0.8 and 1:3.0 and with an effective quantity of hydrated manganese dioxide thereby substantially dissolving the diphenylol propane while impurities present in the crude diphenylol propane remain at least partially undissolved, whereupon said undissolved impurities are isolated and the diphenylol propane is recovered from the solution.

References Cited in the file of this patent

UNITED STATES PATENTS

| | | |
|---|---|---|
| 2,435,593 | Luthy et al. | Feb. 10, 1948 |
| 2,669,588 | Deming et al. | Feb. 16, 1954 |